(12) United States Patent
Nalgirkar et al.

(10) Patent No.: US 9,151,396 B2
(45) Date of Patent: Oct. 6, 2015

(54) VALVE ASSEMBLY WITH INTEGRAL SENSORS

(75) Inventors: Pankaj Nalgirkar, Pune (IN); Rahul L. Navale, Plymouth, MN (US); Kevin E. Alstrin, Waconia, MN (US)

(73) Assignee: EATON CORPORATION, Cleveland, OH (US)

( * ) Notice: Subject to any disclaimer, the term of this patent is extended or adjusted under 35 U.S.C. 154(b) by 627 days.

(21) Appl. No.: 13/480,779

(22) Filed: May 25, 2012

(65) Prior Publication Data

US 2012/0298237 A1 Nov. 29, 2012

Related U.S. Application Data

(60) Provisional application No. 61/490,394, filed on May 26, 2011.

(51) Int. Cl.
*F16K 11/07* (2006.01)
*F16K 31/06* (2006.01)
*F16K 27/04* (2006.01)
(Continued)

(52) U.S. Cl.
CPC .............. *F16K 11/07* (2013.01); *F15B 13/086* (2013.01); *F16K 27/041* (2013.01); *F16K 31/0613* (2013.01); *F16K 37/005* (2013.01); *Y10T 137/8326* (2015.04); *Y10T 137/86879* (2015.04); *Y10T 137/87885* (2015.04)

(58) Field of Classification Search
CPC ..... F16K 27/041; F16K 37/005; F16K 11/07; F16K 31/0613; Y10T 137/86897; Y10T 137/87885; Y10T 137/8326
USPC ............ 137/315.03, 487.5, 625.64, 884, 557, 137/625.48; 251/129.08, 129.15–129.22, 251/367

See application file for complete search history.

(56) References Cited

U.S. PATENT DOCUMENTS

| 4,796,661 A | 1/1989 | Hishinuma et al. |
| 4,798,527 A | 1/1989 | Gunda |

(Continued)

FOREIGN PATENT DOCUMENTS

| DE | 4334980 | 4/1995 |
| DE | 19530935 | 2/1997 |

(Continued)

OTHER PUBLICATIONS

Bosch Rexroth AG, "4/3 proportional directional valve, direct operated, with pQ functionality and field bus interface (IAC-P)", Jan. 2008 (28 pages).

(Continued)

*Primary Examiner* — Atif Chaudry
(74) *Attorney, Agent, or Firm* — Jarett D. Millar (57) ABSTRACT

A valve assembly includes an electronics housing and a valve housing assembly engaged to the electronics housing. The valve housing assembly includes a valve body defining a plurality of fluid ports in fluid communication with the valve bore. A plurality of fluid dampeners is disposed in the fluid ports. A sensor plate is engaged to the valve body. The sensor plate defines a plurality of sensor ports that are generally aligned with the fluid ports of the valve body. At least four fluid sensors are disposed in the plurality of fluid ports of the valve body. A cover is engaged to the sensor plate. The cover defines a cavity. A circuit board is disposed in the cavity of the cover. The circuit board is in electrical communication with the fluid sensors.

19 Claims, 8 Drawing Sheets

(51) Int. Cl.
*F16K 37/00* (2006.01)
*F15B 13/08* (2006.01)

(56) References Cited

U.S. PATENT DOCUMENTS

| | | |
|---|---|---|
| 5,819,783 A | 10/1998 | Blatt et al. |
| 6,612,332 B2 * | 9/2003 | Miyazoe et al. ............ 137/552 |
| 6,901,315 B2 | 5/2005 | kockemann |
| 6,913,037 B2 | 7/2005 | Miyazoe et al. |
| 6,957,584 B2 | 10/2005 | Jackson |
| 6,990,999 B2 | 1/2006 | Patel |
| 7,270,046 B2 | 9/2007 | Stephenson et al. |
| 8,117,920 B2 | 2/2012 | Vogler |
| 8,266,902 B2 | 9/2012 | Nolle et al. |
| 8,594,852 B2 | 11/2013 | Alstrin et al. |
| 8,800,593 B2 * | 8/2014 | Sakasegawa et al. ...... 137/487.5 |
| 2005/0139274 A1 * | 6/2005 | Patel ........................ 137/625.64 |

FOREIGN PATENT DOCUMENTS

| | | |
|---|---|---|
| DE | 102006020277 A1 | 10/2007 |
| EP | 1586777 | 10/2005 |

OTHER PUBLICATIONS

International Search Report and Written Opinion mailed Oct. 10, 2012.

* cited by examiner

VALVE ASSEMBLY WITH INTEGRAL SENSORS

CROSS-REFERENCE TO RELATED APPLICATION

This application claims the benefit of U.S. Provisional Patent Application Ser. No. 61/490,394, filed May 26, 2011, which application is hereby incorporated by reference in its entirety.

BACKGROUND

Off-road vehicles (e.g., skid steers, front end loaders, backhoes, wheel loaders, etc.) and various industrial applications typically include hydraulic components/systems for actuating various components of those vehicles/applications. Such hydraulic components can include various pumps, motors, cylinders, valves and sensors.

SUMMARY

An aspect of the present disclosure relates to a valve assembly. The valve assembly includes an electronics housing and a valve housing assembly engaged to the electronics housing. The valve housing assembly includes a valve body defining a plurality of fluid ports. A sensor plate is engaged to the valve body. The sensor plate defines a plurality of sensor ports that are generally aligned with the fluid ports of the valve body. A plurality of fluid sensors is disposed in the plurality of fluid ports of the valve body. A cover is engaged to the sensor plate. The cover defines a cavity. A circuit board is disposed in the cavity of the cover. The circuit board is in electrical communication with the fluid sensors.

Another aspect of the present disclosure relates to a valve assembly. The valve assembly includes an electronics housing and a valve housing assembly engaged to the electronics housing. The valve housing assembly includes a valve body defining a plurality of fluid ports in fluid communication with the valve bore. A plurality of fluid dampeners is disposed in the fluid ports. A sensor plate is engaged to the valve body. The sensor plate defines a plurality of sensor ports that are generally aligned with the fluid ports of the valve body. At least four fluid sensors are disposed in the plurality of fluid ports of the valve body. A cover is engaged to the sensor plate. The cover defines a cavity. A circuit board is disposed in the cavity of the cover. The circuit board is in electrical communication with the fluid sensors.

Another aspect of the present disclosure relates to a valve assembly. The valve assembly includes an electronics housing and a valve housing assembly engaged to the electronics housing. The valve housing assembly includes a valve body defining a plurality of fluid ports in fluid communication with the valve bore. The valve body includes a manifold mounting surface, which is adapted to abut a fluid device, and an oppositely disposed mounting surface. A valve is disposed in the valve bore of the valve body. A plurality of fluid dampeners is disposed in the fluid ports. Each of the fluid dampeners includes an orifice through which fluid passes to the fluid sensor, the orifice is at an oblique angle relative to a central longitudinal axis of the fluid dampener. A sensor plate is engaged to the mounting surface of the valve body. The sensor plate defines a plurality of sensor ports that is generally aligned with the fluid ports of the valve body. At least four fluid sensors are disposed in the fluid ports of the valve body. A cover is engaged to the sensor plate. The cover defines a cavity. A circuit board is disposed in the cavity of the cover.

The circuit board is in electrical communication with the fluid sensors. The circuit board is generally parallel to the mounting surface of the valve body. A conduit connects the electronics housing to the valve housing assembly. The conduit has a first axial end and an oppositely disposed second axial end. The first axial end is engaged with the cover. The second axial end is engaged with the electronics housing. The conduit provides a passageway from the cavity of the cover to the electronics housing.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Referring now to FIGS. 1-4, a valve assembly 10 is shown. The valve assembly 10 includes a valve housing assembly 12 and an electronics housing 14 engaged to the valve housing assembly 12.

The valve housing assembly 12 includes a valve body 16. In the depicted embodiment, the valve body 16 includes a manifold mounting surface 18 that is adapted to serve as a mounting location for a fluid device (e.g., pump, motor, steering unit, cylinder, etc.). The valve body 16 further includes a first axial end 19, an oppositely disposed second axial end 20, a first side 21 and an oppositely disposed second side 22. In the depicted embodiment, the manifold mounting surface 18 is generally perpendicular to the first and second axial ends 19, 20. In the depicted embodiment, the manifold mounting surface 18 is generally perpendicular to the first and second sides 21, 22.

The valve body 16 defines a first length L1 that is measured from the first axial end 19 to the second axial end 20. The valve body further defines a first width W1 that is measured from the first side 21 to the second side 22. In the depicted embodiment, the first length L1 is greater than the first width W1.

The valve body 16 defines a valve bore 24. In the depicted embodiment, the valve bore 24 extends through the first and second axial ends 19, 20. The valve bore 24 defines a central longitudinal axis 26.

The valve body 16 further defines a first plurality of fluid ports 28. In the depicted embodiment, the valve body 16 defines a fluid inlet port 28a, a fluid outlet port 28b, a first work port 28c and a second work port 28d. The ports 28 extend through the manifold mounting surface 18 and are adapted for fluid communication with corresponding ports in the fluid device. The ports 28 are in fluid communication with the valve bore 24 defined by the valve body 16.

A valve 30 is disposed in the valve bore 24. In the depicted embodiment, the valve 30 is a proportional valve. In the depicted embodiment, the valve 30 includes a sleeve 32, which is disposed in the valve bore 24 of the valve body 16, and a spool 34, which is disposed in a bore 36 of the sleeve 32.

The valve body 16 further includes a mounting surface 38. In the depicted embodiment, the mounting surface 38 is oppositely disposed from the manifold mounting surface 18. In the depicted embodiment, the mounting surface 38 and the manifold mounting surface 18 are generally parallel. In the depicted embodiment, the mounting surface 38 is generally perpendicular to the first and second axial ends 19, 20 of the valve body 16.

The valve body 16 defines a second plurality of fluid ports 39. The second plurality of fluid ports 39 is in fluid communication with the corresponding first plurality of fluid ports 28. In the depicted embodiment, a first fluid port 39a is in fluid communication with the fluid inlet port 28a, a second fluid port 39b is in fluid communication with the fluid outlet port 28b, a third fluid port 39c is in fluid communication with the first work port 28c, and a fourth fluid port 39d is in fluid communication with the second work port 28d. Each of the fluid ports 39 extends through the mounting surface 38.

Figure 1:
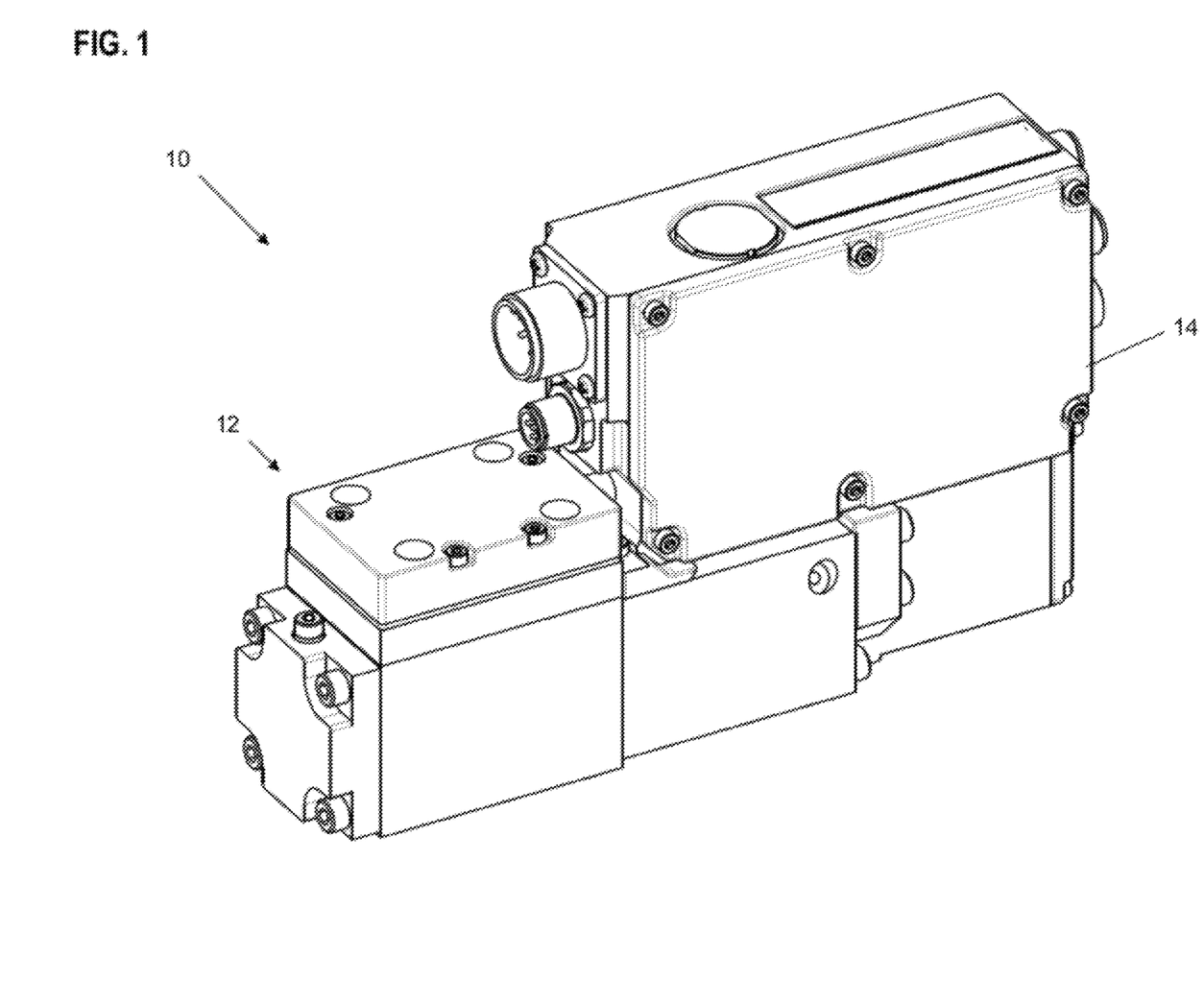
FIG. 1 is an isometric view of a valve assembly having exemplary features of aspects in accordance with the principles of the present disclosure.
Figure 2:
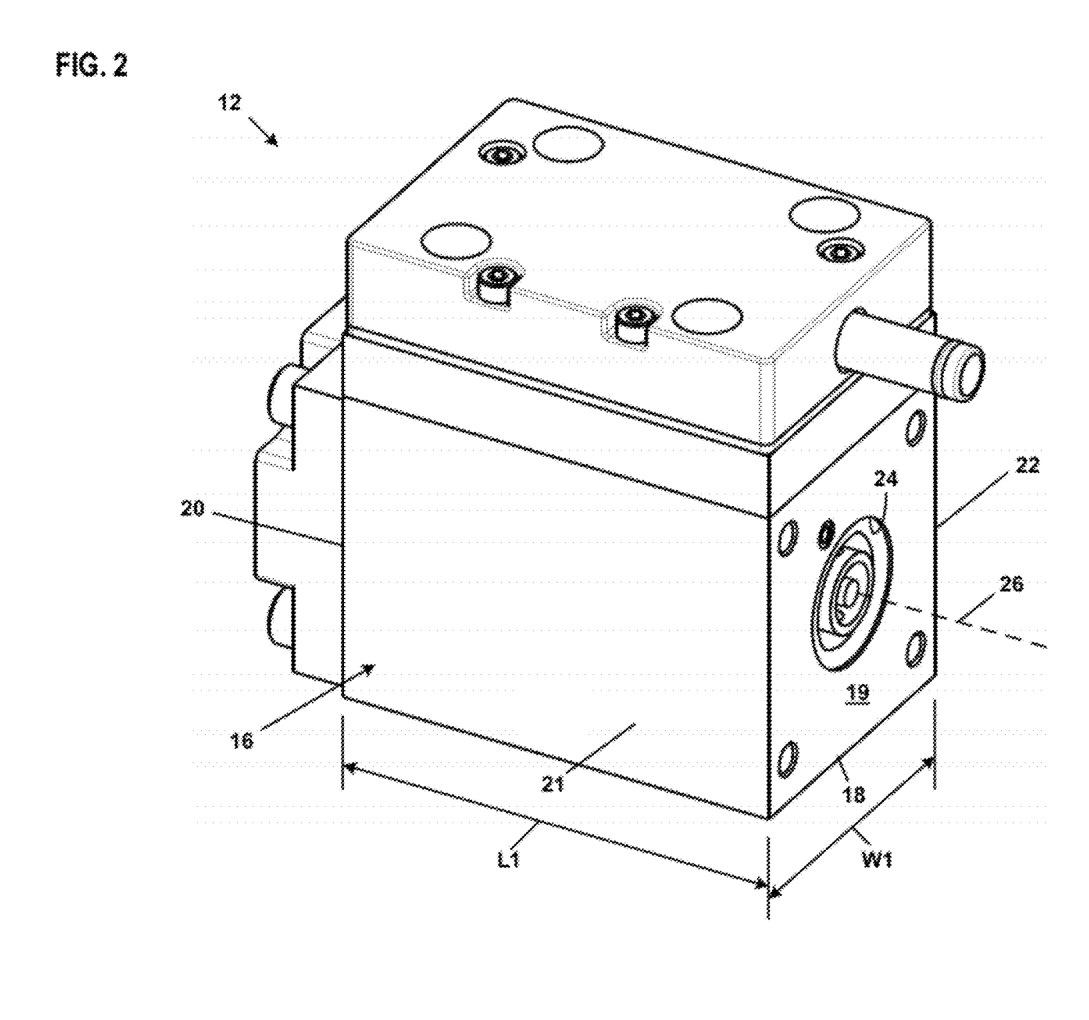
FIG. 2 is an isometric view of a valve housing assembly suitable for use with the valve assembly of FIG. 1.
Figure 3:
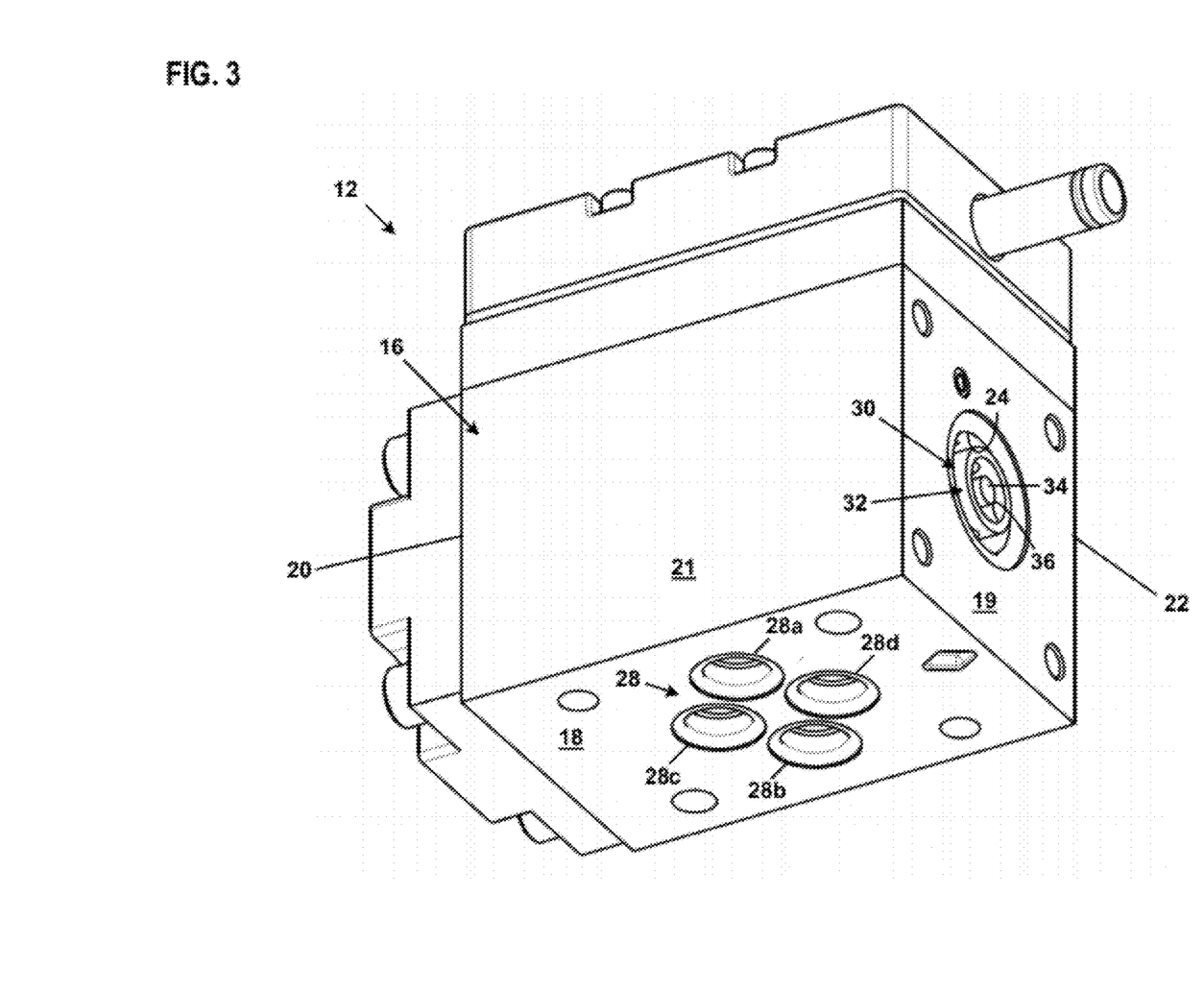
FIG. 3 is another isometric view of the valve housing assembly of FIG. 2.
Figure 4:
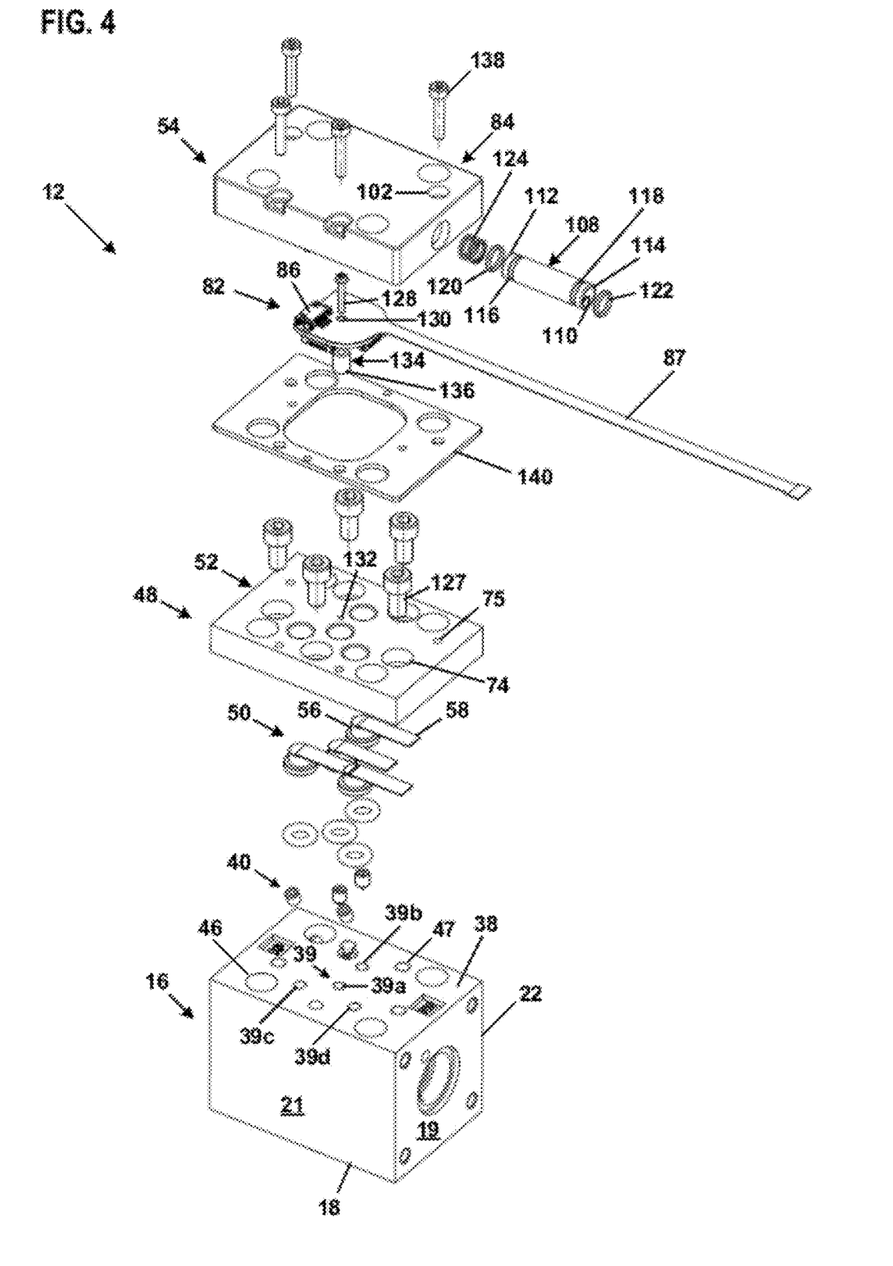
FIG. 4 is an exploded isometric view of the valve housing assembly of FIG. 2.
Figure 5:
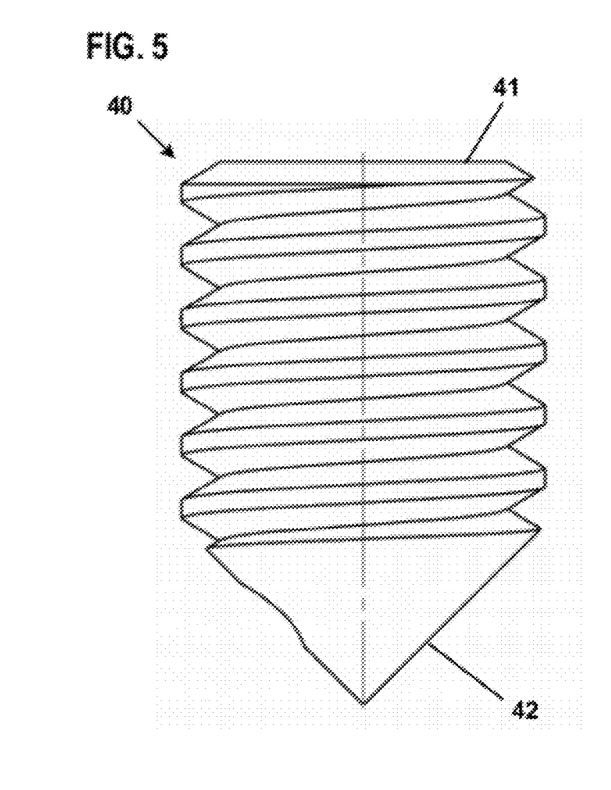
FIG. 5 is an isometric view of a fluid dampener suitable for use with the valve housing assembly of FIG. 2.
Figure 6:
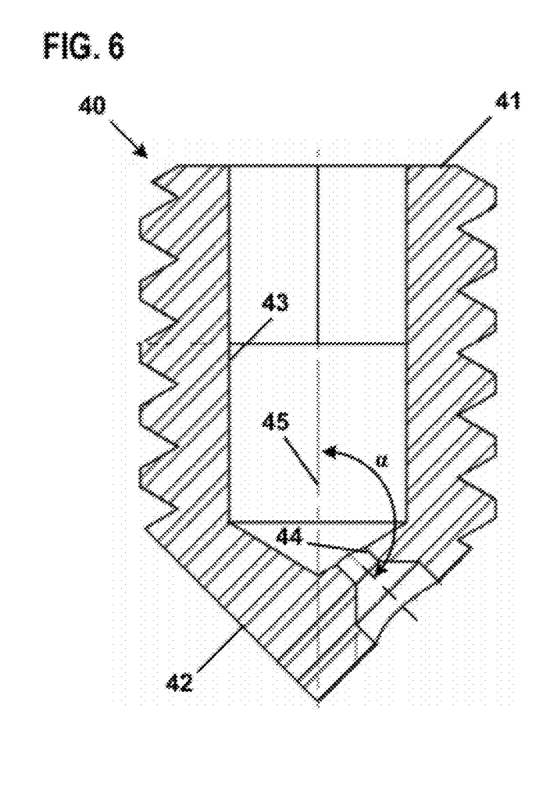
FIG. 6 is a cross-sectional view of the fluid dampener of FIG. 5.

Referring now to FIGS. 4-6, a plurality of fluid dampeners 40 is disposed in the second plurality of fluid ports 39. In the depicted embodiment, the fluid dampeners 40 include external threads that are threadedly engaged in the fluid ports 39. The fluid dampeners 40 include a first axial end 41 and an oppositely disposed second axial end 42. Each of the fluid dampeners 40 defines a recess 43 having an opening in the first axial end 41.

The second axial end 42 of the fluid dampener 40 defines an orifice 44 that extends through the second axial end 42 of the fluid dampeners 40 into the recess 43. In one embodiment, the orifice 44 is offset from a central axis 45 of the fluid dampener 40 by an angle α. In the depicted embodiment, the angle α is an oblique angle relative to the central axis 45 of the fluid dampener 40.

The valve body 16 further defines a plurality of thru holes 46. In the depicted embodiment, the thru holes 46 extend through the manifold mounting surface 18 and the mounting surface 38. The thru holes 46 are adapted to receive fasteners so that the valve assembly 10 can be secured to the fluid device.

The valve body 16 further defines a plurality of mounting holes 47. The mounting holes 47 include internal threads and are adapted to receive fasteners (e.g., bolts, screws, etc.). Each of the mounting holes 47 has an opening at the mounting surface 38.

Referring now to FIG. 4, the valve housing assembly 12 further includes a sensor plate assembly 48. The sensor plate assembly 48 is engaged to the valve body 16. In one embodiment, the sensor plate assembly 48 is engaged to the mounting surface 38. In the depicted embodiment, the sensor plate assembly 48 includes a plurality of fluid sensors 50, a sensor plate 52, and a cover assembly 54.

The sensor plate assembly 48 includes a plurality of fluid sensors 50. at least four fluid sensors 50. In the depicted embodiment, the sensor plate assembly 48 includes at least four fluid sensors 50. The fluid sensors 50 are adapted to sense characteristics (e.g., temperature, pressure, etc.) of the fluid passing through the valve assembly 10. In the depicted embodiment, the fluid sensors are adapted to sense pressure of the fluid passing through the valve assembly 10.

Each of the fluid sensors 50 includes a body portion 56 and a connection portion 58. In the depicted embodiment, the body portion 56 includes a sensor element that is adapted to sense characteristics (e.g., temperature, pressure, etc.) of the fluid. The connection portion 58 is electrically connected to the sensor element of the body portion 56.

Figure 7:
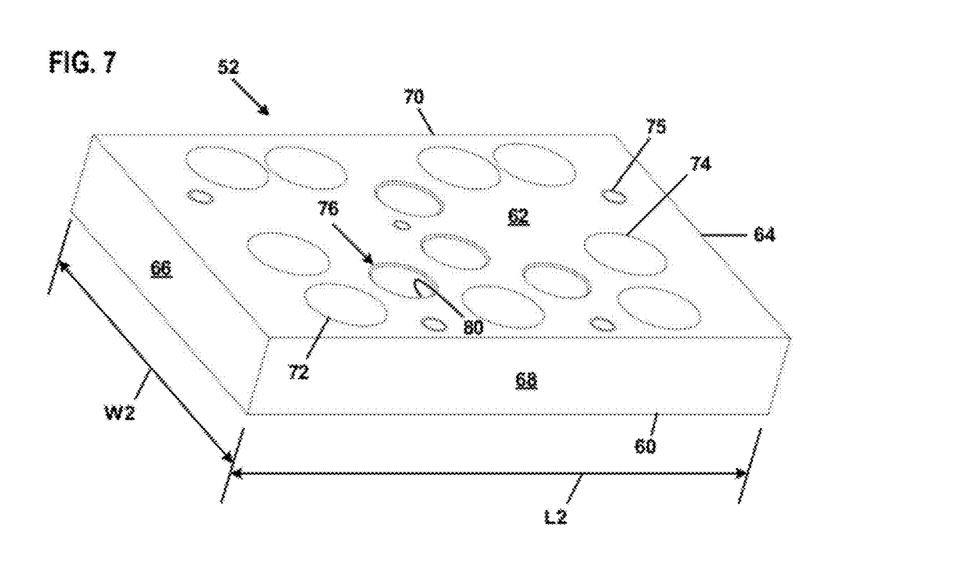
FIG. 7 is an isometric view of a sensor plate suitable for use with the valve housing assembly of FIG. 2.
Figure 8:
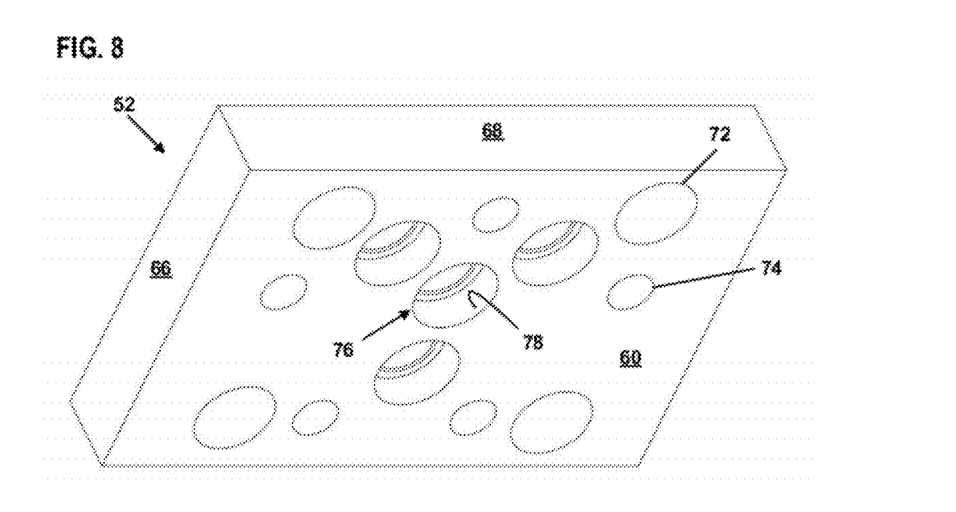
FIG. 8 is another isometric view of the sensor plate of FIG. 7.

Referring now to FIGS. 4 and 7-8, the sensor plate 52 includes a first surface 60 and an oppositely disposed second surface 62. In the depicted embodiment, the first and second surfaces 60, 62 are generally parallel. The first surface 60 is adapted to abut the mounting surface 38 of the valve body 16.

The sensor plate 52 further includes a first end 64, an oppositely disposed second end 66, a first side 68 and an oppositely disposed second side 70. In the depicted embodiment, the first and second ends 64, 66 are generally perpendicular to the first and second surfaces 60, 62. In the depicted embodiment, the first and second sides 68, 70 are generally perpendicular to the first and second surface 60, 62 and the first and second ends 64, 66.

The sensor plate 52 defines a second length L2 that is measured from the first end 64 to the second end 66. The sensor plate 52 further defines a second width W2 that is measured from the first side 68 to the second side 70. In the depicted embodiment, the second length L2 is greater than the second width W2. In the depicted embodiment, the second length L2 is less than or equal to the first length L1 of the valve body 16. In the depicted embodiment, the second width W2 is less than or equal to the first width W1 of the valve body 16.

The sensor plate 52 defines a plurality of thru holes 72 that extend through the first and second surfaces 60, 62 of the sensor plate 52. The thru holes 72 are adapted for alignment with the plurality of thru holes 46 in the valve body 16 when the sensor plate 52 is engaged to the valve body 16.

The sensor plate 52 further defines a first plurality of mounting holes 74 that extend through the sensor plate 52. The first plurality of mounting holes 74 is adapted for alignment with the plurality of mounting holes 47 of the valve body 16 when the sensor plate 52 is engaged to the valve body 16.

The sensor plate 52 defines a second plurality of mounting holes 75. In the depicted embodiment, the second plurality of mounting holes 75 has internal threads. The second plurality of mounting holes 75 is adapted to fasteners for fastening the cover assembly 54 to the sensor plate 52.

The sensor plate 52 further defines a plurality of sensor ports 76. The sensor ports 76 are adapted to receive the fluid sensors 50. The sensor ports 76 are disposed in the sensor plate 52 so that the sensor ports 76 are in fluid communication with the second plurality of fluid ports 39 of the valve body 16. In the depicted embodiment, the sensor ports 76 are generally aligned with the fluid ports 39 of the valve body 16.

The sensor ports 76 extend through the first and second surfaces 60, 62 of the sensor plate 52. In the depicted embodiment, each of the sensor ports 76 includes a first portion 78 and a second portion 80. The first portion 78 is immediately adjacent to the first surface 60 and includes an opening in the first surface 60. The second portion 80 is immediately adjacent to the second surface 62 and includes an opening in the second surface 62. The first portion 78 of the sensor port 76 is adapted to receive at least a portion of the body portion 56 of the fluid sensor 50 while the second portion 80 of the sensor port 76 is adapted to receive the connection portion 58 of the fluid sensor 50. In the depicted embodiment, the first portion 78 of the sensor port 76 has an inner diameter that is greater than an inner diameter of the second portion 80.

Referring now to FIG. 4, the cover assembly 54 is engaged to the sensor plate 52. The cover assembly 54 includes a circuit board 82 and a cover 84.

The circuit board 82 is in communication with the fluid sensors 50. The circuit board 82 includes a plurality of connections 86 that is adapted electrically couple the circuit board 82 to the plurality of fluid sensors 50. Through the plurality of connections 86, the circuit board 82 provides power to each of the plurality of fluid sensors 50. In addition, the circuit board 82 receives signals related to the sensed characteristics of the fluid from each of the plurality of fluid sensors 50 and transmits those signals to the electronics housing 14 of the valve assembly 10. In the depicted embodiment, the circuit board 82 transmits the signals from the fluid sensors 50 through a cable 87 that is connected to the circuit board 82. In the depicted embodiment, the cable 87 is a ribbon cable.

Figure 9:
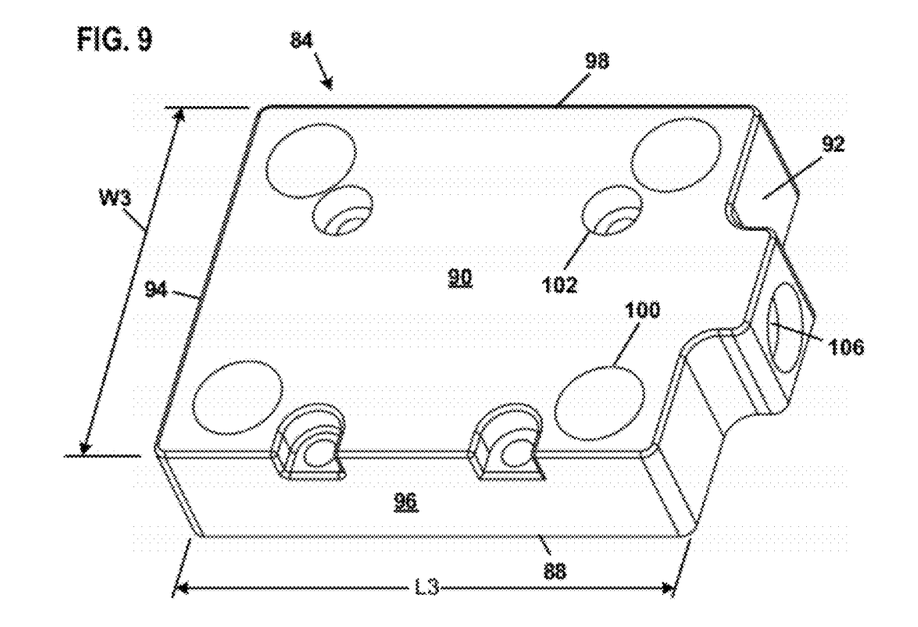
FIG. 9 is an isometric view of a cover suitable for use with the valve housing assembly of FIG. 2.
Figure 10:
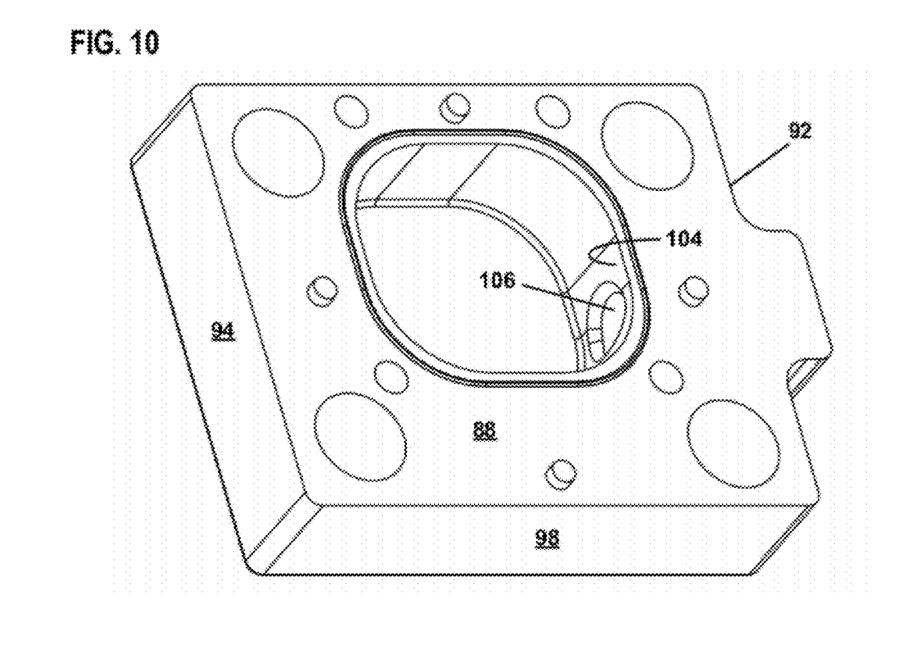
FIG. 10 is another isometric view of the cover of FIG. 9.

Referring now to FIGS. 4, 9 and 10, the cover 84 houses the circuit board 82. The cover 84 includes a first surface 88 and an oppositely disposed second surface 90 that is generally parallel to the first surface 88. The cover 84 further includes a first end surface 92, an oppositely disposed second end surface 94, a first side surface 96 and an oppositely disposed second side surface 98. The first and second end surfaces 92, 94 extend between the first and second surfaces 88, 90. The first and second side surfaces 96, 98 extend between the first and second end surfaces 92, 94. In the depicted embodiment, the first and second end surfaces 92, 94 and the first and second side surfaces 96, 98 are generally perpendicular to the first and second surfaces 88, 90.

The cover 84 defines a third length L3 that is measured from the first end surface 92 to the second end surface 94. The cover 84 further defines a third width W3 that is measured from the first side surface 96 to the second side surface 98. In the depicted embodiment, the third length L3 is greater than the third width W3. In the depicted embodiment, the third length L3 is less than or equal to the first length L1 of the valve body 16. In the depicted embodiment, the third width W3 is less than or equal to the first width W1 of the valve body 16.

The cover 84 defines a plurality of thru-holes 100 that extends through the first and second surfaces 88, 90 of the cover 84. The thru-holes 100 are disposed in the cover 84 so that the thru-holes 100 are aligned with the thru-holes 72 of the sensor plate 52 when the cover 84 is engaged to the sensor plate 52.

The cover 84 defines a plurality of mounting holes 102 that extends through the first and second surfaces 88, 90 of the cover 84. The mounting holes 102 are disposed in the cover 84 so that the mounting holes 102 are aligned with the second plurality of mounting holes 75 of the sensor plate 52 when the cover 84 is engaged to the sensor plate 52.

The cover 84 defines a cavity 104 that extends through the first surface 88 of the cover 84. The cavity 104 receives the circuit board 82 so that the circuit board 82 is generally parallel to the first surface 88. In the depicted embodiment, the circuit board 82 is disposed completely within the cavity 104.

The cover 84 further defines a passage 106 that extends from the cavity 104 through the first end surface 92. The passage 106 is sized to receive the cable 87.

In the depicted embodiment, the cover assembly 54 further includes a conduit 108. The conduit 108 is adapted to surround a portion of the cable 87 as the cable 87 passes from the valve housing assembly 12 to the electronics housing 14. The conduit 108 defines a bore 110 through which the cable 87 passes.

The conduit 108 includes a first axial end 112 and an oppositely disposed second axial end 114. The first axial end 112 is engaged to the passage 106 of the cover 84. The second axial end 114 is engaged to the electronics housing 14. The conduit 108 defines a first groove 116 disposed adjacent the first axial end 112 and a second groove 118 disposed adjacent the second axial end 114. A first seal 120 is disposed in the first groove 116 and a second seal 122 is disposed in the second groove 118. In the depicted embodiment, the first and second seals 120, 122 are o-rings.

In order to prevent the first and second seals 120, 122 from twisting in the first and second grooves 116, 118, a spring 124 is disposed in the passage 106 of the cover 84 so that it biases the conduit 108 outwardly from the cover 84 and into the electronics housing 14. In the depicted embodiment, the spring 124 abuts the first axial end 112 of the conduit 108.

Figure 11:
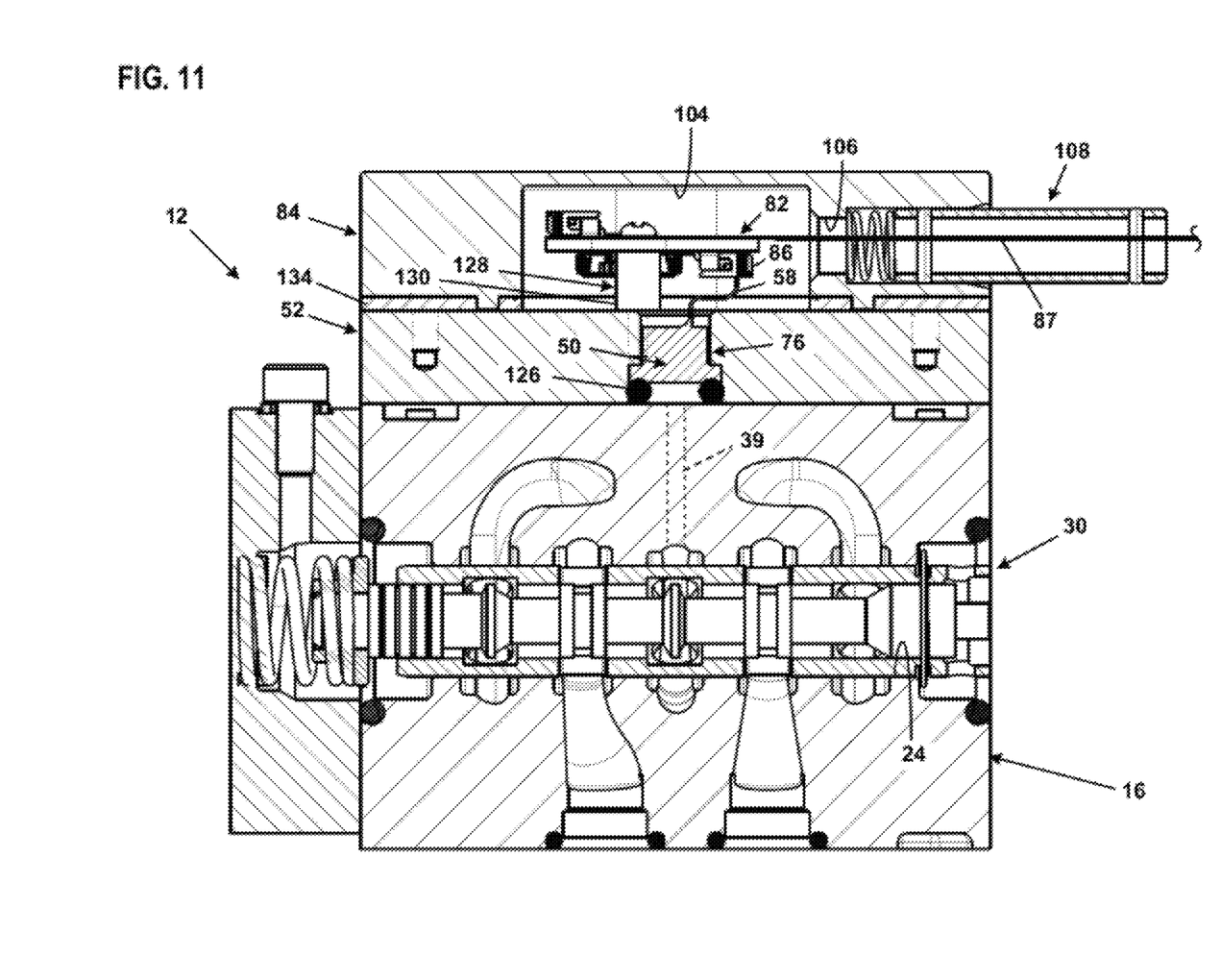
FIG. 11 is a cross-sectional view of the valve housing assembly of FIG. 2.

Referring now to FIGS. 4 and 11, the assembly of the valve housing assembly 12 will be described. The valve 30 is disposed in the valve bore 24 of the valve body 16. The fluid dampeners 40 are engaged in the second plurality of fluid ports 39 of the valve body 16. In the depicted embodiment, the fluid dampeners 40 are threaded into the fluid ports 39.

The fluid sensors 50 are installed into the sensor ports 76 of the sensor plate 52. In the depicted embodiment, the connection portions 58 of the fluid sensors 50 are passed (i.e., threaded) through the sensor ports 76. The body portions 56 of the fluid sensors 50 are inserted into the first portions 78 of the sensor ports 76.

With the fluid sensors 50 disposed in the sensor ports 76, the sensor plate 52 is engaged to the valve body 16. Fasteners 127 (e.g., bolts, screws, etc.) are inserted through the first plurality of mounting holes 74 of the sensor plate 52 and engage the plurality of mounting holes 47 of the valve body 16. In the depicted embodiment, the fasteners 127 are threadedly engaged in the mounting holes 47 of the valve body 16.

The sensor plate 52 is disposed on the valve body 16 so that the sensor ports 76 of the sensor plate 52 are in fluid communication with the fluid ports 39 of the valve body 16. In the depicted embodiment, seals 126 are disposed at the interfaces between the sensor ports 76 and the fluid ports 39. In one embodiment, the seals 126 are o-rings.

The connection portions 58 of the fluid sensors 50 are electrically connected to the connections 86 of the circuit board 82. With the fluid sensors 50 electrically connected to the circuit board 82, the circuit board 82 is mounted to sensor plate 52. A fastener 128 secures the circuit board 82 to the sensor plate 52. The fastener 128 passes through an opening 130 in the circuit board 82 and threadedly engages a mounting hole 132 of the sensor plate 52. In the depicted embodiment, a spacer 134 is mounted to the circuit board 82. The spacer 134 includes an end 136 that is adapted to abut the sensor plate 52 when the circuit board 82 is engaged to the sensor plate 52. The spacer 134 offsets the circuit board 82 from the second surface 62 of the sensor plate 52.

The cable 87 is passed through the passage 106 of the cover 84 and through the conduit 108. The cable 87 passes into the electronics housing 14. With the connection portions 58 of the fluid sensors 50 connected to the connections 86 of the circuit board 82, The cover 84 is placed over the circuit board 82 so that the circuit board 82 is disposed in the cavity 104 of the cover 84.

With the circuit board 82 disposed in the cavity 104, the cover 84 is engaged to the sensor plate 52. A plurality of fasteners 138 (e.g., screws, bolts, rivets, etc.) pass through the mounting holes 102 of the cover 84 and are engaged with the mounting holes 75 of the sensor plate 52. In the depicted embodiment, the fasteners 138 are threadedly engaged in the mounting holes 75 of the sensor plate 52.

A seal 140 is disposed between the cover 84 and the sensor plate 52. In the depicted embodiment, the seal 140 is a gasket. In another embodiment, the seal 140 is an o-ring that is disposed about a perimeter of the cavity 104.

In the depicted embodiment, the valve housing assembly 12 has an ingress protection rating, as published by the International Electrotechnical Commission, of IP 65. In another embodiment, the valve housing assembly 12 has an ingress protection rating of IP 67.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A valve assembly comprising:
   an electronics housing;
   a valve housing assembly engaged to the electronics housing, the valve housing assembly including:
   a valve body defining a plurality of fluid ports;
   a plurality of fluid dampeners disposed in the fluid ports of the valve body;
   a sensor plate engaged to the valve body, the sensor plate defining a plurality of sensor ports that are generally aligned with the fluid ports of the valve body;
   a plurality of fluid sensors disposed in the sensor ports of the sensor plate;
   a cover engaged to the sensor plate, the cover defining a cavity;
   a circuit board disposed in the cavity of the cover, the circuit board being in electrical communication with the fluid sensors.

2. The valve assembly of claim 1, wherein the valve housing assembly includes at least four fluid sensors.

3. The valve assembly of claim 1, wherein the fluid sensors are adapted to sense pressure of fluid in the fluid ports.

4. The valve assembly of claim 1, wherein each of the fluid dampeners includes an orifice through which fluid passes to the fluid sensor, the orifice being at an oblique angle relative to a central longitudinal axis of the fluid dampener.

5. The valve assembly of claim 1, wherein the fluid dampeners are threadedly engaged in the fluid ports.

6. The valve assembly of claim 1, further comprising a seal disposed between the cover and the sensor plate.

7. The valve assembly of claim 1, wherein a width of the sensor plate is less than or equal to a width the valve body and a length of the sensor plate is less than or equal to a length of the valve body.

8. The valve assembly of claim 1, wherein a width of the cover is less than or equal to a width the valve body and a length of the cover is less than or equal to a length of the valve body.

9. A valve assembly comprising:
   an electronics housing;
   a valve housing assembly engaged to the electronics housing, the valve housing assembly including:
   a valve body defining a plurality of fluid ports;
   a sensor plate engaged to the valve body, the sensor plate defining a plurality of sensor ports that are generally aligned with the fluid ports of the valve body;
   a plurality of fluid sensors disposed in the sensor ports of the sensor plate;
   a cover engaged to the sensor plate, the cover defining a cavity;
   a circuit board disposed in the cavity of the cover, the circuit board being in electrical communication with the fluid sensors; and
   a conduit having a first axial end and an oppositely disposed second axial end, the first axial end being engaged with the cover, the second axial end being engaged with the electronics housing, the conduit providing a passageway from the cavity of the cover to the electronics housing.

10. The valve assembly of claim 9, wherein a spring biases the conduit outwardly from the cover.

11. A valve assembly comprising:
    an electronics housing;
    a valve housing assembly engaged to the electronics housing, the valve housing assembly including:
    a valve body defining a valve bore and a plurality of fluid ports in fluid communication with the valve bore;
    a plurality of fluid dampeners disposed in the fluid ports;
    a sensor plate engaged to the valve body, the sensor plate defining sensor ports that are generally aligned with the fluid ports of the valve body;
    at least four fluid sensors disposed in the sensor ports of the sensor plate;
    a cover engaged to the sensor plate, the cover defining a cavity; and
    a circuit board disposed in the cavity of the cover, the circuit board being in electrical communication with the fluid sensors.

12. The valve assembly of claim 11, wherein the fluid sensors are adapted to sense pressure of fluid in the fluid ports.

13. The valve assembly of claim 11, wherein each of the fluid dampeners includes an orifice through which fluid passes to the fluid sensor, the orifice being at an oblique angle relative to a central longitudinal axis of the fluid dampener.

14. The valve assembly of claim 11, further comprising a conduit having a first axial end and an oppositely disposed second axial end, the first axial end being engaged with the cover, the second axial end being engaged with the electronics housing, the conduit providing a passageway from the cavity of the cover to the electronics housing.

15. A valve assembly comprising:
    an electronics housing;
    a valve housing assembly engaged to the electronics housing, the valve housing assembly including:
    a valve body defining a valve bore and a plurality of fluid ports in fluid communication with the valve bore, the valve body having a manifold mounting surface adapted to abut a fluid device and an oppositely disposed mounting surface;
    a valve disposed in the valve bore;
    a plurality of fluid dampeners disposed in the fluid ports, each of the fluid dampeners including an orifice through which fluid passes to the fluid sensor, the orifice being at an oblique angle relative to a central longitudinal axis of the fluid dampener;
    a sensor plate engaged to the mounting surface of the valve body, the sensor plate defining sensor ports that are generally aligned with the fluid ports of the valve body;

at least four fluid sensors disposed in the sensor ports of the sensor plate;

a cover engaged to the sensor plate, the cover defining a cavity;

a circuit board disposed in the cavity of the cover, the circuit board being in electrical communication with the fluid sensors, wherein the circuit board is generally parallel to the mounting surface of the valve body; and a conduit connecting the electronics housing and the valve housing assembly, the conduit having a first axial end and an oppositely disposed second axial end, the first axial end being engaged with the cover, the second axial end being engaged with the electronics housing, the conduit providing a passageway from the cavity of the cover to the electronics housing.

16. The valve assembly of claim 15, wherein the fluid sensors are adapted to sense pressure of fluid in the fluid ports.

17. The valve assembly of claim 15, wherein a spring biases the conduit outwardly from the cover.

18. The valve assembly of claim 15, further comprising a seal disposed between the cover and the sensor plate.

19. The valve assembly of claim 18, wherein the seal is a gasket.

* * * * *